(12) United States Patent
Jung et al.

(10) Patent No.: US 8,427,621 B2
(45) Date of Patent: Apr. 23, 2013

(54) LIQUID CRYSTAL DISPLAY

(75) Inventors: Jae-Hoon Jung, Incheon (KR); Su-Jeong Kim, Seoul (KR); Ki-Chul Shin, Asan-si (KR); Hoon Kim, Ansan-si (KR); Ho-Kil Oh, Asan-si (KR)

(73) Assignee: Samsung Display Co., Ltd., Yongin (KR)

( * ) Notice: Subject to any disclaimer, the term of this patent is extended or adjusted under 35 U.S.C. 154(b) by 151 days.

(21) Appl. No.: 13/174,214

(22) Filed: Jun. 30, 2011

(65) Prior Publication Data

US 2012/0236245 A1  Sep. 20, 2012

(30) Foreign Application Priority Data

Mar. 14, 2011  (KR) .......................... 10-2011-0022294

(51) Int. Cl.
*G02F 1/1343* (2006.01)
(52) U.S. Cl.
USPC .......................................... 349/144
(58) Field of Classification Search .................. 349/144
See application file for complete search history.

(56) References Cited

U.S. PATENT DOCUMENTS 8,169,582 B2 * 5/2012 Jung et al. ..................... 349/146

* cited by examiner

*Primary Examiner* — Phu Vu
(74) *Attorney, Agent, or Firm* — H.C. Park & Associates, PLC (57) ABSTRACT

A liquid crystal display includes a first subpixel electrode and a second subpixel electrode, in which a shape of the second subpixel electrode is a quadrilateral in which two angles facing each other are obtuse angles or acute angles and the first subpixel electrode surrounds the second subpixel electrode.

25 Claims, 10 Drawing Sheets

LIQUID CRYSTAL DISPLAY

CROSS-REFERENCE TO RELATED APPLICATION

This application claims priority to and the benefit of Korean Patent Application No. 10-2011-0022294 filed on Mar. 14, 2011, the entire contents of which are incorporated herein by reference for all purposes as if fully set forth herein.

BACKGROUND

1. Field

A liquid crystal display is provided.

2. Discussion of the Background

A liquid crystal display as one of flat panel display devices that are widely being used includes two panels where a pair of field generating electrodes is formed and a liquid crystal layer interposed therebetween.

The liquid crystal display generates an electric field in a liquid crystal layer by applying voltage to the field generating electrode, to determine orientations of liquid crystal molecules of the liquid crystal layer and control polarization of incident light, thereby displaying an image.

The liquid crystal display includes a switching element connected to a pixel electrode and a plurality of signal lines such as gate lines and data lines for applying the voltage to the pixel electrode by controlling the switching element.

Among the liquid crystal displays, a vertically aligned mode liquid crystal display, in which a long axis of the liquid crystal molecules is aligned to be perpendicular to the panel while the electric field is not applied, has a high contrast ratio and a wide reference viewing angle.

SUMMARY OF THE INVENTION

Exemplary embodiments provide a liquid crystal display that may have improved transmittance and response speed of the liquid crystal molecules.

In an exemplary embodiment, a liquid crystal display includes: a first substrate; a second substrate facing the first substrate; a liquid crystal layer disposed between the first substrate and the second substrate and including liquid crystal molecules; and a pixel electrode including a first subpixel electrode and a second subpixel electrode, in which a shape of the second subpixel electrode is a quadrilateral in which two angles facing each other are obtuse angles or acute angles and the first subpixel electrode surrounds the second subpixel electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE EMBODIMENTS

Exemplary embodiments are described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Figure 1:
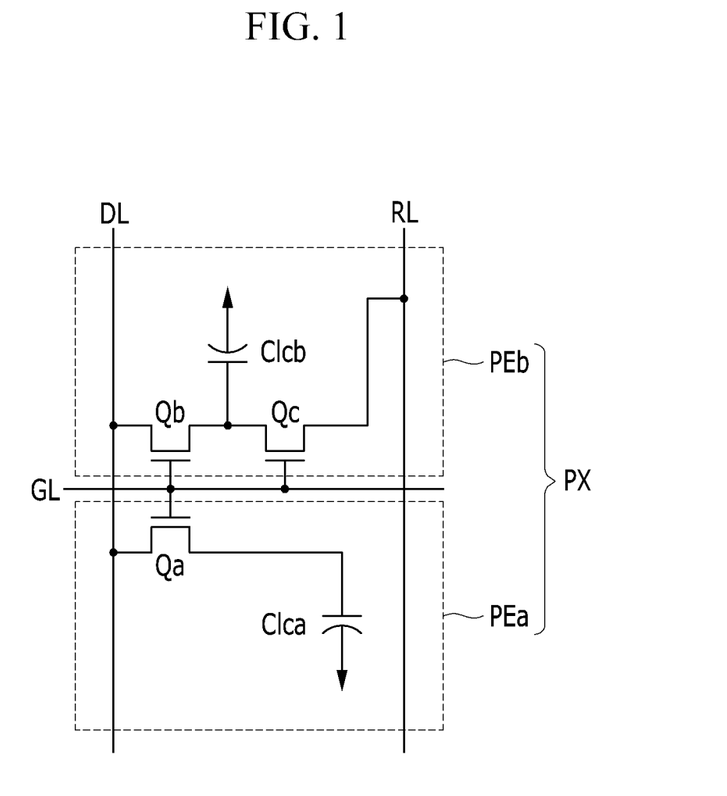
FIG. 1 is an equivalent circuit diagram for one pixel of a liquid crystal display according to an exemplary embodiment.
Figure 2:
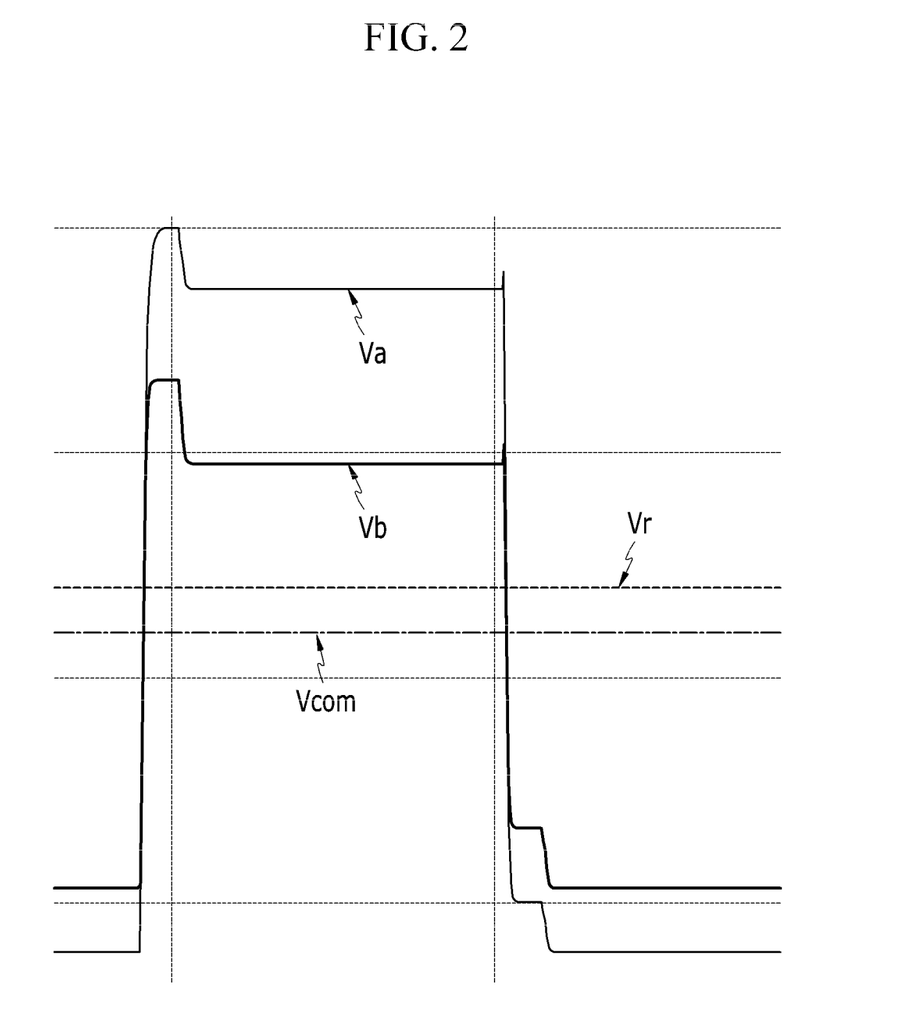
FIG. 2 is a waveform diagram of a signal applied to a pixel of a liquid crystal display according to an exemplary embodiment.

A liquid crystal display according to an exemplary embodiment will be described with reference to FIG. 1 and FIG. 2. FIG. 1 is an equivalent circuit diagram for one pixel of a liquid crystal display according to an exemplary embodiment. FIG. 2 is a waveform diagram of a signal applied to a pixel of a liquid crystal display according to an exemplary embodiment.

Referring to FIG. 1, one pixel PX of the liquid crystal display includes a first subpixel electrode PEa and a second subpixel electrode PEb. The pixel PX include multiple signal lines including a gate line GL transmitting a gate signal, a data line DL transmitting a data signal, and a reference voltage line RL transmitting a reference voltage Vr. The pixel PX includes a first switching element Qa, a second switching element Qb, and a third switching element Qc that are connected to multiple signal lines. Further, the pixel PX includes a first liquid crystal capacitor Clca and a second liquid crystal capacitor Clcb. In an exemplary embodiment, the third switching element Qc and the reference voltage line RL may be omitted.

The first switching element Qa and the second switching element Qb are connected to the gate line GL and the data line DL. The third switching element Qc is connected to an output terminal of the second switching element Qb and the reference voltage line RL. In an exemplary embodiment, the first switching element Qa, the second switching element Qb, and the third switching element Qc may be three-terminal elements such as a thin film transistor.

In an exemplary embodiment, a control terminal of the first switching element Qa is connected to the gate line GL, an input terminal of the first switching element Qa is connected to the data line DL, and an output terminal of the first switching element Qa is connected to the first liquid crystal capacitor Clca.

In an exemplary embodiment, a control terminal of the second switching element Qb is connected to the gate line GL, an input terminal of the second switching element Qb is connected to the data line DL, and an output terminal of the second switching element Qb is connected to the second liquid crystal capacitor Clcb and an input terminal of the third switching element Qc.

In an exemplary embodiment, a control terminal of the third switching element Qc is connected to the gate line GL, the input terminal of the third switching element Qc is connected to the second liquid crystal capacitor Clcb, and an output terminal of the third switching element Qc is connected to the reference voltage line RL.

Referring to FIG. 2, the reference voltage Vr is applied through the reference voltage line RL and a common voltage Vcom is applied through a common electrode. If a gate on signal Von is applied to the gate line GL, the first switching element Qa, the second switching element Qb, and the third switching element Qc are turned on. The data voltage applied to the data line DL is applied to the first subpixel electrode PEa and the second subpixel electrode PEb through the first switching element Qa and the second switching element Qb, respectively. Herein, the data voltage applied to the first subpixel electrode PEa and the second subpixel electrode PEb may be charged by the same value. The voltage applied to the second subpixel electrode PEb is divided between the third switching element Qc and the second switching element Qb, which is connected to the Qc in series. Therefore, a voltage Vb applied to the second subpixel electrode PEb may be smaller than a voltage Va applied to the first subpixel electrode PEa. Thus, the voltage stored in the first liquid crystal capacitor Clca and the voltage stored in the second liquid crystal capacitor Clcb may be different from each other. Therefore, the inclined angles of the liquid crystal molecules may be different in the first subpixel electrode PEa and the second subpixel electrode PEb. Thus, a luminance of the first subpixel and a luminance of the second subpixel may be different from each other. In an exemplary embodiment, if the voltage stored in the first liquid crystal capacitor Clca and the voltage stored in the second liquid crystal capacitor Clcb are adjusted appropriately, an image viewed from the side of an exemplary LCD appears to be approximately the same as the image viewed from the front of the LCD, thereby improving side visibility.

In exemplary embodiments, a voltage that is smaller than the voltage applied to the first subpixel may be applied to the second subpixel. The voltage applied to the second subpixel and the voltage applied to the first subpixel may be swung based on the common voltage Vcom. If the reference voltage Vr is applied through the reference voltage line RL connected to the third switching element Qc, the voltage applied to the second subpixel may increase and a difference between an optimal common voltage in the first subpixel and an optimal common voltage in the second subpixel may decrease. Accordingly, afterimage and flicker generated by distortion of the common voltages in the first subpixel and the second subpixel may decrease, thereby improving visibility.

In an exemplary embodiment, the reference voltage Vr may be swung. If the reference voltage is swung, transmittance may be improved, because a voltage level applied to the second subpixel in a positive polarity increases and a voltage level applied to the second subpixel in a negative polarity decreases. Furthermore, the reference voltage Vr may be swung while being higher than the common voltage Vcom and in this case, a kickback voltage of the second subpixel may decreases and the flicker and the afterimage generated by distortion of the common voltage may be minimized. For example, the reference voltage Vr may include a swing signal having a duty ratio of 50% to 80%.

Figure 3:
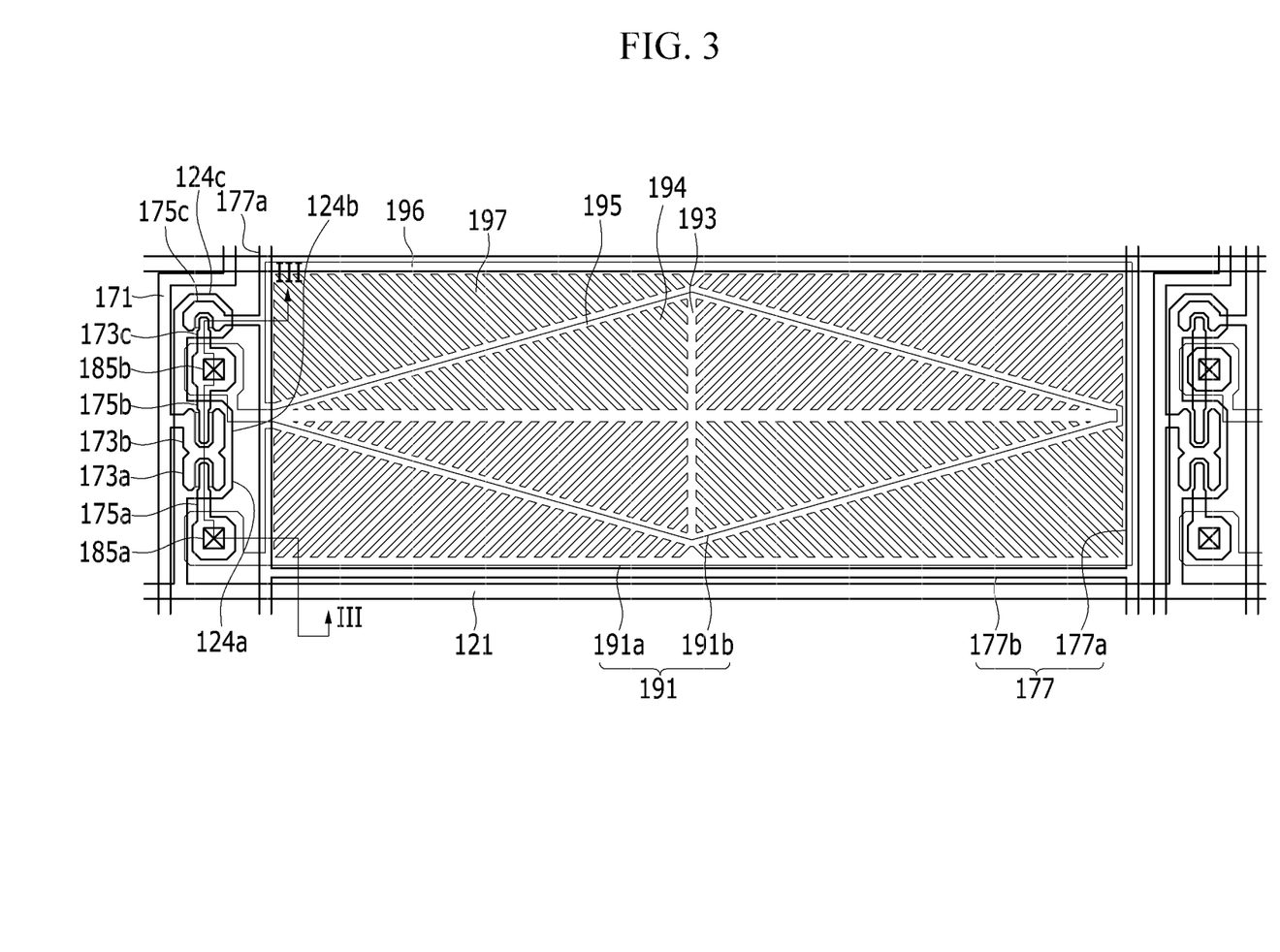
FIG. 3 is a layout view for one pixel of the liquid crystal display shown in FIG. 1.
Figure 4:
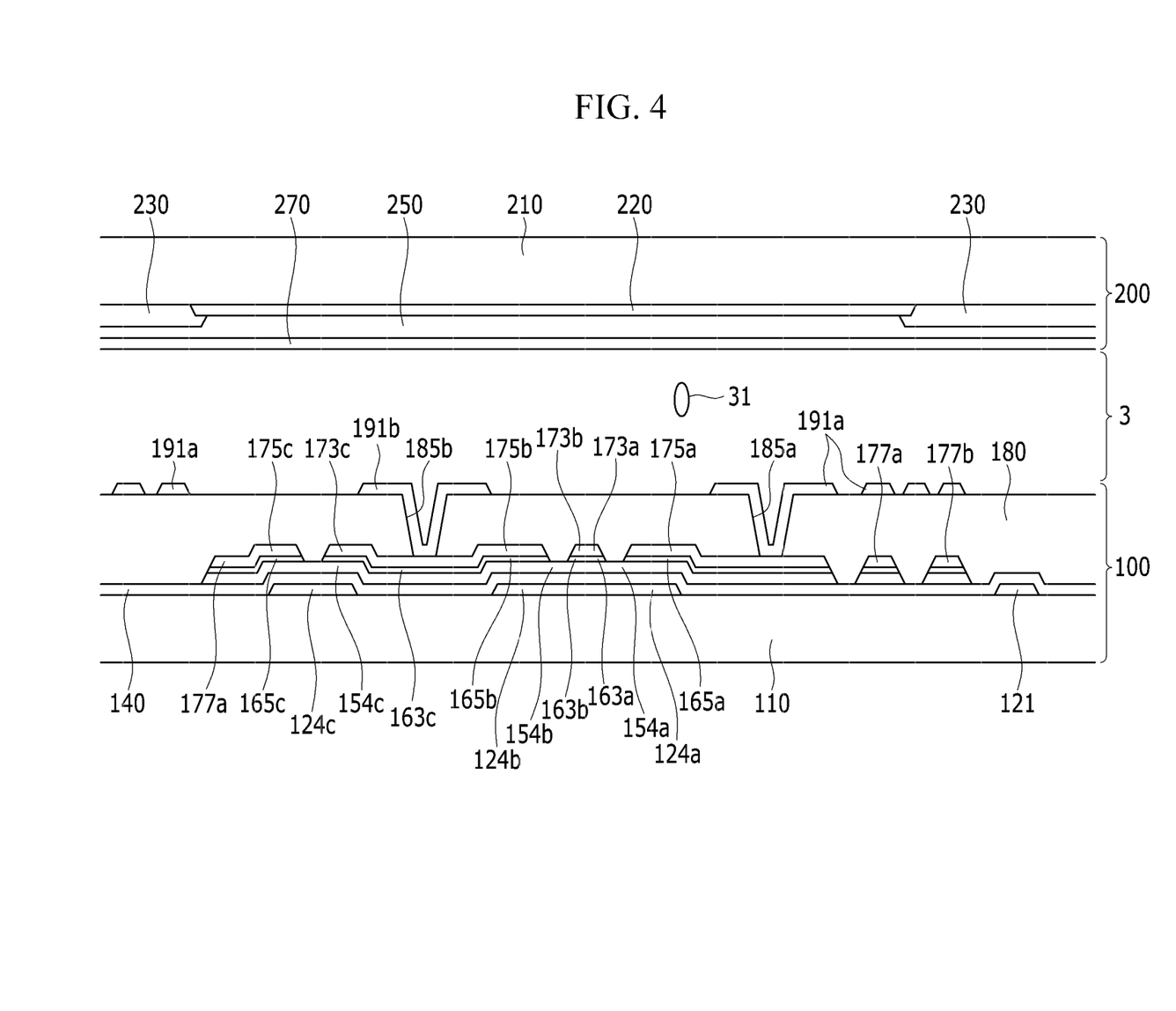
FIG. 4 is a cross sectional view taken along line III-III of FIG. 3.

A structure of the liquid crystal display of FIG. 1 will be described with reference to FIG. 3 and FIG. 4. FIG. 3 is a layout view for one pixel of the liquid crystal display shown in FIG. 1. FIG. 4 is a cross sectional view taken along line III-III of FIG. 3.

Referring to FIG. 3 and FIG. 4, the liquid crystal display includes a lower panel 100 and an upper panel 200 which face each other and a liquid crystal layer 3 interposed between lower panel 100 and upper panel 200. A pair of polarizers may be disposed at the outer surfaces of the panels 100 and 200.

First, the lower panel 100 will be described.

A substrate 110 may contain an insulating material such as glass or plastic and may be transparent. A gate line 121 is disposed on the substrate 110. The gate line 121 includes a first gate electrode 124a, a second gate electrode 124b, a third gate electrode 124c, and a wide end portion (not shown) for connecting other layer or an external driving circuit.

A gate insulating layer 140 is disposed on the gate line 121. A first semiconductor 154a, a second semiconductor 154b, and a third semiconductor 154c are disposed on the gate insulating layer 140.

Multiple ohmic contacts 163a, 165a, 163b, 165b, 163c, and 165c are positioned on the first semiconductor 154a, the second semiconductor 154b, and the third semiconductor 154c.

Multiple data lines 171 including a first source electrode 173a and a second source electrode 173b and data conductors 171, 173c, 175a, 175b, 175c, and 177 including a first drain electrode 175a, a second drain electrode 175b, a third source electrode 173c, a third drain electrode 175c, and a reference voltage line 177 are positioned on the ohmic contacts 163a, 165a, 163b, 165b, 163c, and 165c and the gate insulating layer 140.

The data conductors, the semiconductors, and the ohmic contacts positioned below the data conductors may be simultaneously formed using one mask.

The data line 171 includes a wide end portion (not shown) for connecting other layer and an external driving circuit.

The reference voltage line 177 includes two vertical parts 177a approximately parallel to the data line 171 and a horizontal part 177b connecting the two vertical parts 177a to each other. Delays in a signal flow into the reference voltage line 177 may be prevented by connecting the two vertical parts 177a to the horizontal part 177b.

The vertical part 177a of the reference voltage line 177 is positioned between the pixel electrode 191 and the data line 171 and is connected to the third drain electrode 175c. The horizontal part 177b of the reference voltage line 177 is positioned between the pixel electrode 191 and the gate line 121. Accordingly, the reference voltage line 177 may reduce signal interferences between the pixel electrode 191 and the data line 171 and between the pixel electrode 191 and the gate line 121.

The first gate electrode 124a, the first source electrode 173a, and the first drain electrode 175a form the first thin film transistor Qa together with the first semiconductor 154a and a channel of the thin film transistor formed in the semiconductor portion 154a between the first source electrode 173a and the first drain electrode 175a. Similarly, the second gate electrode 124b, the second source electrode 173b, and the second drain electrode 175b form the second thin film transistor Qb together with the second semiconductor 154b, a channel of the thin film transistor formed in the semiconductor portion 154b between the second source electrode 173b and the second drain electrode 175b. The third gate electrode 124c, the third source electrode 173c and the third drain electrode 175c form the third thin film transistor Qc together with the third semiconductor 154c, and a channel of the thin film transistor is formed in the semiconductor portion 154c between the third source electrode 173c and the third drain electrode 175c.

A passivation layer 180 is formed on the data conductors 171, 173a, 173b, 173c, 175a, 175b, 175c, and 177 and the exposed semiconductor portions 154a, 154b, and 154c. The passivation layer 180 may contain an inorganic insulating material such as silicon nitride and silicon oxide or an organic insulating material and may have a flat surface. The inorganic insulating material may have photosensitivity and dielectric constant of about 4.0 or less. The passivation layer 180 may have a two-layer structure including a lower inorganic layer and an upper inorganic layer to prevent the damage to the exposed semiconductor portions 154a, 154b, and 154c while maintaining the insulating property of an organic layer.

Multiple contact holes 185a and 185b, which expose the first drain electrode 175a and the second drain electrode 175b, are formed in the passivation layer 180.

The pixel electrode 191 including a first subpixel electrode 191a and a second subpixel electrode 191b is positioned on the passivation layer 180. The pixel electrode 191 may contain a transparent conductive material such as ITO or IZO or a reflective material such as aluminum, silver, chromium, or an alloy thereof.

The pixel electrode 191 approximately illustrates one pixel PX. In an exemplary embodiment, the horizontal length of the pixel PX is longer than the vertical length. By way of example, the horizontal length of the pixel PX may be three times longer than the vertical length. The total number of the data lines 171 decreases if the horizontal length of the pixel is greater than the vertical length, and thus, the number of IC chips for a data driver may decrease, and thereby reduce manufacturing costs. Although the number of the gate lines 121 increases, since the cost of IC chips for a gate driver is less than the cost of the IC chips for the data driver, reducing the number of the IC chips for the data driver may be more profitable than reducing the number of the IC chips for the gate driver.

An entire shape of the second subpixel electrode 191b is approximately a quadrilateral and two angles facing each other in the quadrilateral may be obtuse angles or acute angles. In addition, two sides facing each other in the quadrilateral may be approximately parallel to each other. The lengths of two sides facing each other in the quadrilateral may be approximately equal. By way of example, the entire shape of the second subpixel electrode 191b may be a rhombus.

The second subpixel electrode 191b includes a cross stem 193 including a horizontal stem and a vertical stem crossing therewith. The horizontal stem may be approximately parallel to the gate line 121, the vertical stem may be approximately parallel to the data line 171. The horizontal stem may be approximately perpendicular to the vertical stem. The second subpixel electrode 191b may be divided into four subregions by the cross stem 193 and each of the subregions may include a plurality of branches 194 and an oblique side portion 195. The oblique side portion 195 connects ends of the multiple branches 194 to each other. The four subregions of the second subpixel electrode 191b are an upper right region, a lower right region, an upper left region, and a lower left region.

The branches 194 of the second subpixel electrode 191b obliquely extend toward an upper right direction, a lower right direction, a lower left direction, and an upper left direction from the cross stem 193, respectively. By way of example, the branches 194 of the second subpixel electrode 191b may extend at an angle of approximately 35 degrees to approximately 55 degrees from the cross stem 193. In addition, widths of the multiple branches 194 may gradually increase.

The first subpixel electrode 191a surrounds the second subpixel electrode 191b and the shape of the first subpixel electrode 191a is a quadrilateral. The shape of the first subpixel electrode 191a includes a hole inside of the quadrilateral, and the hole is approximately in the shape of the second subpixel electrode 191b. In an exemplary embodiment, two sides facing each other in the quadrilateral may be approximately parallel to each other. The lengths of two sides facing each other in the quadrilateral may be approximately equal. In addition, two angles facing each other in the quadrangle may be approximately right angles. By way of example, the entire shape of the first subpixel electrode 191a may be a rectangle having a rhombus-shaped hole.

The first subpixel electrode 191a includes a surrounding portion 196 of the quadrangle. The first subpixel electrode 191a may be divided into four subregions located around the four corners of the quadrilateral surrounding portion 196 and each subregion may include a plurality of branches 197. The four subregions of the first subpixel electrode 191a are an upper right region, a lower right region, an upper left region, and a lower left region.

The branches 197 of the first subpixel electrode 191a obliquely extend toward an upper right direction, a lower right direction, a lower left direction, and an upper left direction from the cross stem 193 around four corners of the quadrangular surrounding portion 196, respectively. By way of example, the branches 197 of the first subpixel electrode 191a may extend at an angle of approximately 35 degrees to approximately 55 degrees. In addition, widths of the multiple branches 197 may gradually increase.

In an exemplary embodiment, the branches 194 of the second subpixel electrode 191b and the branches 197 of the first subpixel electrode 191a may face each other. In an exemplary embodiment, the branches 194 of the second subpixel electrode 191b and the branches 197 of the first subpixel electrode 191a may have approximately the same inclined angles. The branches 194 of the upper right region of the second subpixel electrode 191b and the branches 197 of the upper right region of the first subpixel electrode 191a may face each other and have approximately the same inclined angles. In an exemplary embodiment, the shape of the branches 194 of the upper right region of the second subpixel electrode 191b which is rotated 180 degrees may be approximately the same as the shape of the branches 197 of the upper right region of the first subpixel electrode 191a. Similarly, the branches 194 of the lower right region of the second subpixel electrode 191b and the branches 197 of the lower right region of the first subpixel electrode 191a may face each other and have approximately the same inclined angles. In an exemplary embodiment, a shape of when the shape of the branches 194 of the lower right region of the second subpixel electrode 191b is rotated 180 degrees may be approximately the same as the shape of the branches 197 of the lower right region of the first subpixel electrode 191a. The branches 194 of the upper left region of the second subpixel electrode 191b and the branches 197 of the upper left region of the first subpixel electrode 191a may face each other and have approximately the same inclined angles. In an exemplary embodiment, the shape of the branches 194 of the upper left region of the second subpixel electrode 191b which is rotated 180 degrees may be approximately the same as the shape of the branches 197 of the upper left region of the first subpixel electrode 191a. The branches 194 of the lower left region of the second subpixel electrode 191b and the branches 197 of the lower left region of the first subpixel electrode 191a may face each other and have approximately the same inclined angles. In an exemplary embodiment, the shape of the branches 194 of the lower left region of the second subpixel electrode 191b which is rotated 180 degrees may be approximately the same as the shape of the branches 197 of the lower left region of the first subpixel electrode 191a, thereby easily controlling the generation of a texture.

Since the branches 194 of the second subpixel electrode 191b and the branches 197 of the first subpixel electrode 191a have relatively short lengths, the response speed of the liquid crystal molecules rotated by the applied voltage may be fast. The oblique side portion 195 of the second subpixel electrode 191b may disperse the force applied to the liquid crystal and reduce disclination generated in the corners of the second subpixel electrode 191b. In addition, transmittance may be increased by having an opening positioned around the oblique side portion 195 of the second subpixel electrode 191b.

The first subpixel electrode 191a and the second subpixel electrode 191b are physically and electrically connected to the first drain electrode 175a and the second drain electrode 175b through contact holes 185a and 185b, respectively and receive the data voltage from the first drain electrode 175a and the second drain electrode 175b. In this case, a part of the data voltage applied to the second drain electrode 175b is divided through the third source electrode 173c, such that a magnitude of the voltage applied to the second subpixel electrode 191b may be smaller than that of the voltage applied to the first subpixel electrode 191a.

In exemplary embodiments, an area of the second subpixel electrode 191b may be about one time to two times larger than that of an area of the first subpixel electrode 191a.

If a ratio of a channel width to a channel length of the second switching element Qb is called a first channel ratio, and a ratio of a channel width to a channel length of the third switching element Qc is called a second channel ratio, the percentage of the first channel ratio in the sum of the first channel ratio and the second channel ratio may be about 60% to 95%. Considering both the transmittance and the visibility, when the area of the second subpixel electrode 191b is about 1 time to about 1.25 times larger than that of the first subpixel electrode 191a, the percentage of the first channel ratio for the sum of the first channel ratio and the second channel ratio may be about 70% to about 80%.

Further, the voltage level applied to the reference voltage line may be higher than the common voltage level applied to the common electrode and a difference between absolute values thereof may be about 1V to about 4V. For example, when the common voltage Vcom is about 7V, the reference voltage Vr may be about 8V to about 11V.

The upper panel 200 will be described with reference to FIG. 3 and FIG. 4.

A light blocking member 220 is positioned on a substrate 210. The light blocking member 220 is called a black matrix and may prevent light leakage.

In addition, multiple color filters 230 are positioned on the substrate 210 and light blocking member 220. The color filters 230 may be mostly disposed in a region surrounded by the light blocking member 220 and may elongate along columns of the pixel electrode 191. The multiple color filters 230 may display one of three primary colors i.e. red, green, and blue. However, the color filters are not limited to three primary colors and may display one of cyan, magenta, yellow, and white-based colors.

In an exemplary embodiment, at least one of the light blocking member 220 and the color filters 230 may be formed on the lower substrate 110.

An overcoat 250 is positioned on the color filters 230 and the light blocking member 220. The overcoat 250 may contain an insulating material to prevent the color filter 230 from being exposed and provide a flat surface. In an exemplary embodiment, the overcoat 250 may be omitted.

A common electrode 270 is positioned on the overcoat 250.

Alignment layers (not shown) may be positioned on both sides of the panels 100 and 200. In an exemplary embodiment, the alignment layer may be a vertical alignment layer.

The liquid crystal layer 3 is interposed between the two panels 100 and 200. The liquid crystal layer 3 includes liquid crystal molecules 31 having a negative dielectric anisotropy. For ease of description, only one liquid crystal molecule 31 is depicted in FIG. 4. The liquid crystal molecules 31 of the liquid crystal layer 3 have a pretilt so that a long axis is approximately parallel to longitudinal directions of the branches 194 and 197 of the first and the second subpixel electrodes 191a and 191b and may be aligned to be perpendicular to the surfaces of the two panels 100 and 200 if the electric field is not applied. In an exemplary embodiment, the liquid crystal layer 3 further includes an alignment aiding agent including reactive mesogen. The liquid crystal molecules 31 may have a pretilt so that the long axis thereof is approximately parallel to the longitudinal directions of the branches 194 and 197 of the first and the second subpixel electrodes 191a and 191b by the alignment aiding agent.

The first subpixel electrode 191a and the second subpixel electrode 191b which receive the data voltage, generate the electric field together with the common electrode 270, which receives the common voltage. A direction of the liquid crystal molecules of the liquid crystal layer 3 between the two electrodes 191a, 191b, and 270 may be determined. In this case, polarization of light passing through the liquid crystal layer 3 varies based on the determined direction of the liquid crystal molecules. The first and the second subpixel electrodes 191a and 191b and the common electrode 270 form liquid crystal capacitors Clca and Clcb and maintain the applied voltage even after the thin film transistor is turned off.

Since all the longitudinal directions in which the branches 194 and 197 of one pixel elongate are four, all the inclined directions of the liquid crystal molecules 31 may be four. As such, if the inclined directions of the liquid crystal molecule 31 are varied, the reference viewing angle of the liquid crystal display may increase.

Figure 5:
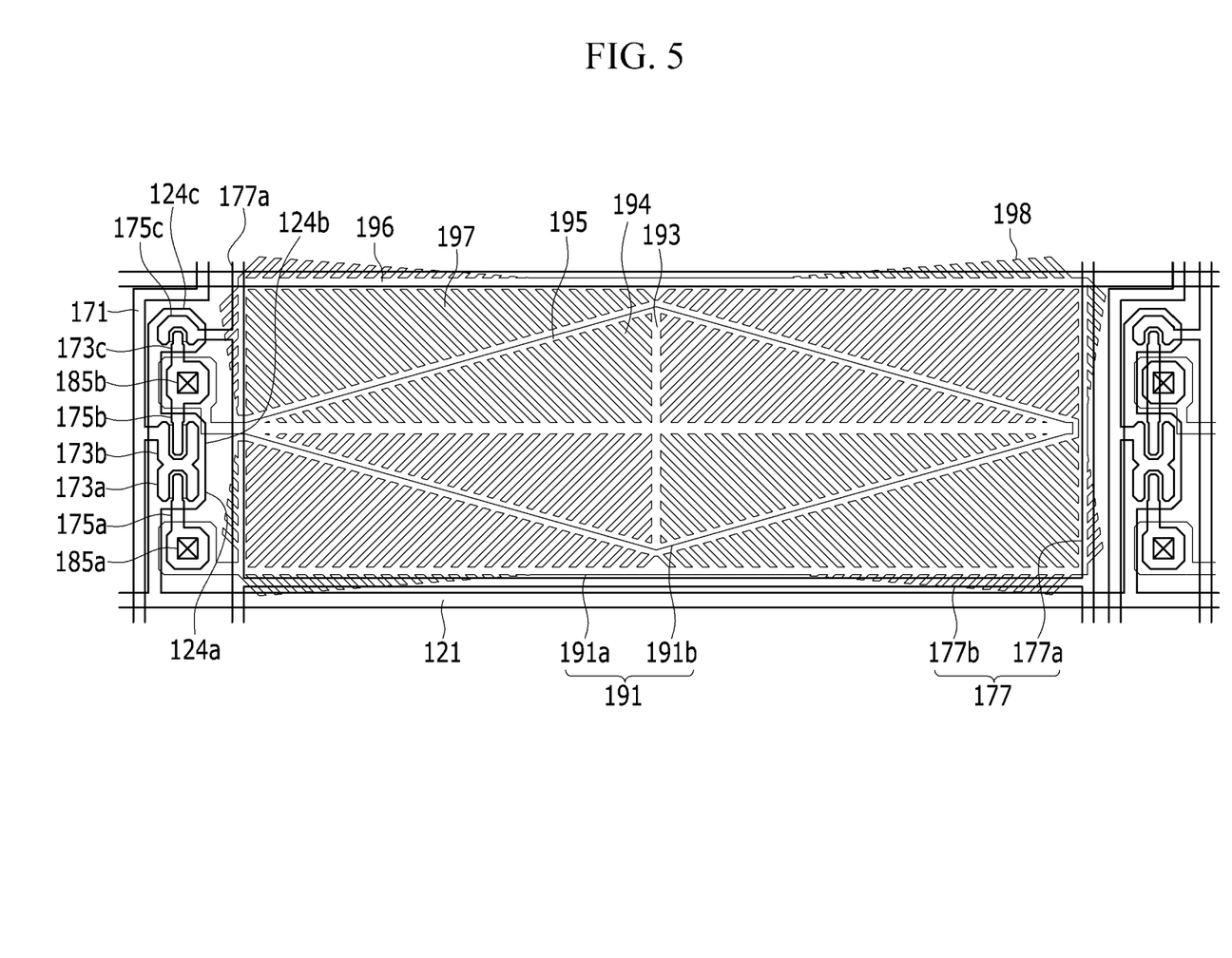
FIG. 5 is a layout view for one pixel of a liquid crystal display according to an exemplary embodiment.
Figure 6:
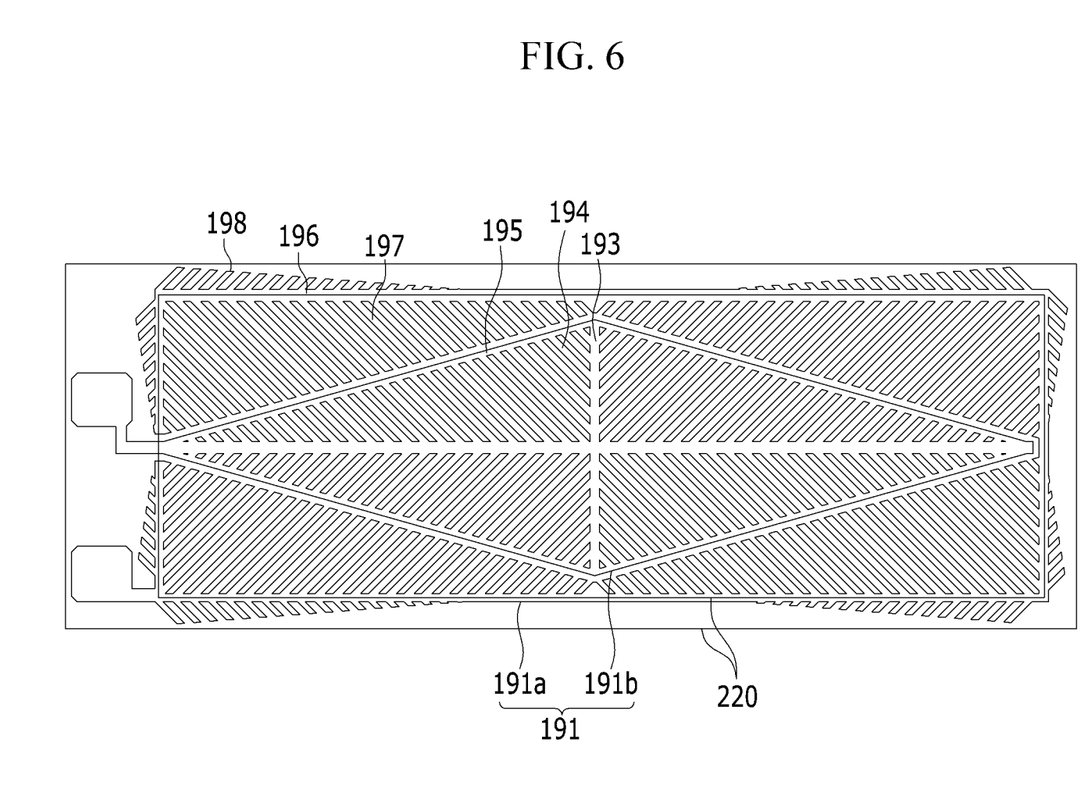
FIG. 6 is a plan view illustrating a pixel electrode and a light blocking electrode in the liquid crystal display of FIG. 5.

Hereinafter, a liquid crystal display according to an exemplary embodiment of the present invention will be described with reference to FIG. 5 and FIG. 6. FIG. 5 is a layout view for one pixel of a liquid crystal display according to an exemplary embodiment. FIG. 6 is a plan view illustrating a pixel electrode and a light blocking electrode in the liquid crystal display of FIG. 5. Where the description of FIG. 5 and FIG. 6 duplicates the descriptions of FIG. 1 to FIG. 4 it is omitted.

Referring to FIG. 5 and FIG. 6, the first subpixel electrode 191*a* includes a dummy pixel portion 198, which is disposed around the corner of the first subpixel electrode 191*a*. The dummy pixel portion 198 includes branches. The dummy pixel portion 198 may overlap the light blocking member 220 and be disposed in a non-display region. In addition, the dummy pixel portion 198 may be disposed in the light blocking member 220. The branches of the dummy pixel portion 198 may extend in a direction which is symmetric with the branches 197 of the first subpixel electrode 191*a* based on the surrounding portion 196 of the first subpixel electrode 191*a*. In an exemplary embodiment, the lengths of the dummy pixel portions 198 may gradually decrease the further away the dummy pixel portion 198 is from the corner of the first subpixel electrode 191*a*.

The dummy pixel portion 198 may disperse the force applied to the liquid crystal and accordingly, an alignment direction of the liquid crystal around the corner of the surrounding portion 196 of the first subpixel electrode 191*a* may be similar to that of the branches 197 of the first subpixel electrode 191*a*. As a result, the dummy pixel portion 198 may reduce the disclination generated around the corner of the first subpixel electrode 191*a* and improve the transmittance.

Figure 7:
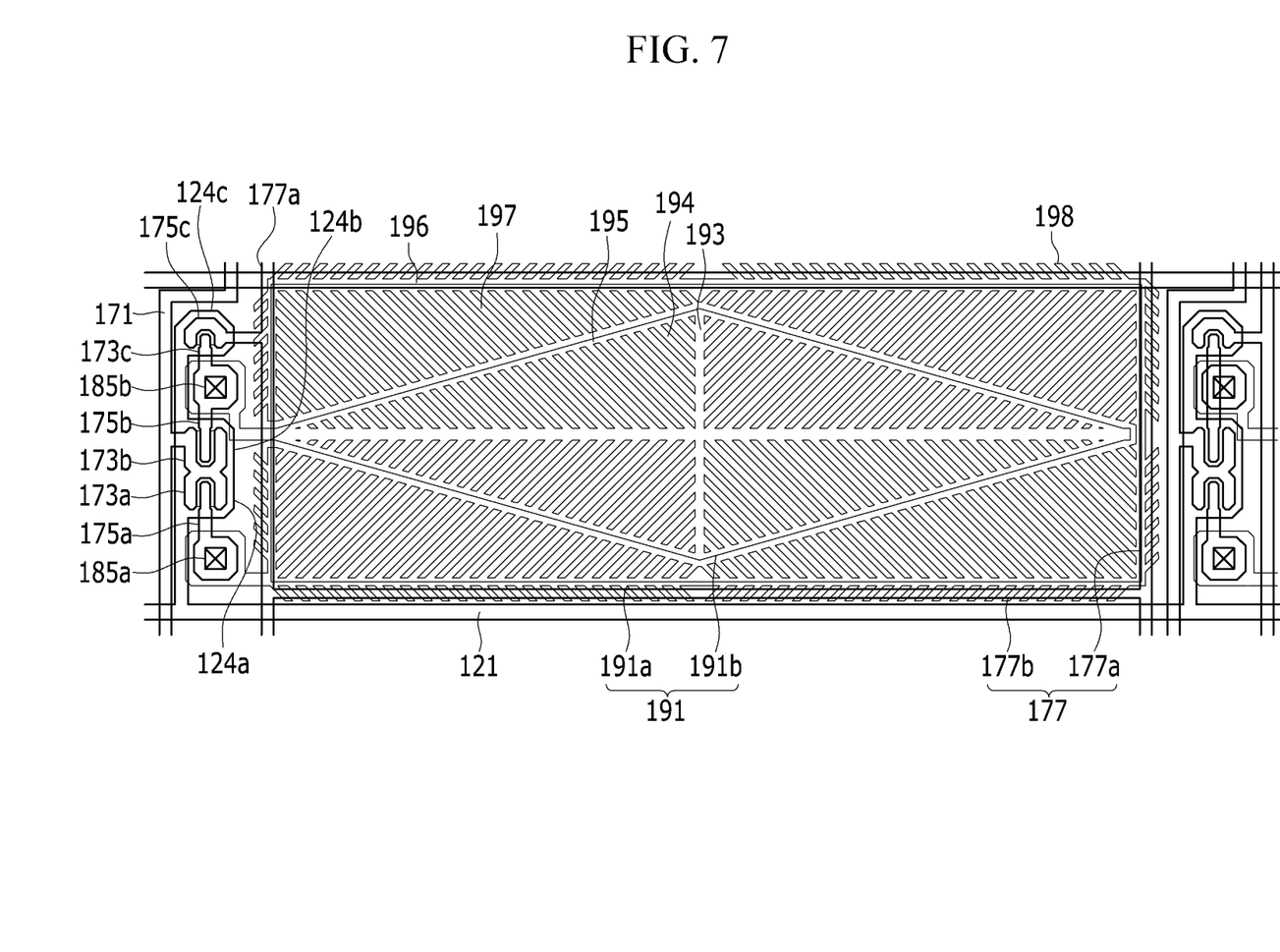
FIG. 7 is a layout view for one pixel of a liquid crystal display according to an exemplary embodiment.
Figure 8:
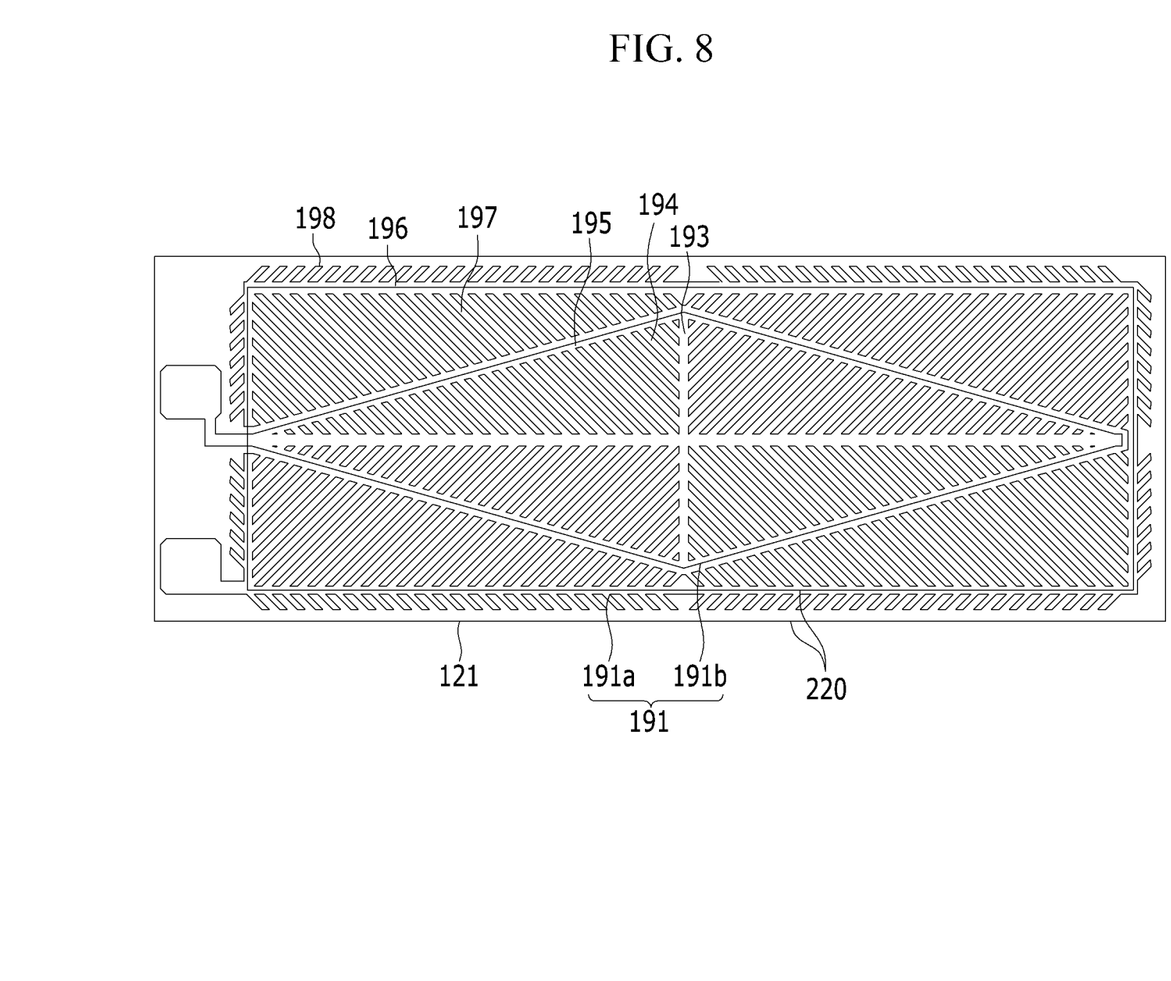
FIG. 8 is a plan view illustrating a pixel electrode and a light blocking electrode in the liquid crystal display of FIG. 7.

Hereinafter, a liquid crystal display according to an exemplary embodiment of the present invention will be described with reference to FIG. 7 and FIG. 8. FIG. 7 is a layout view for one pixel of a liquid crystal display according to an exemplary embodiment of the present invention and FIG. 8 is a top plan view illustrating a pixel electrode and a light blocking electrode in the liquid crystal display of FIG. 7. Where the description of FIG. 7 and FIG. 8 duplicates the descriptions of FIG. 1 to FIG. 4 it is omitted.

Referring to FIG. 7 and FIG. 8, the first subpixel electrode 191*a* includes a dummy pixel portion 198, which is disposed around the corner of the first subpixel electrode 191*a*. The dummy pixel portion 198 includes branches. The dummy pixel portion 198 may overlap the light blocking member 220 and be disposed in a non-display region. The dummy pixel portion 198 may extend in a direction which is symmetrical around on the surrounding portion 196 of the first subpixel electrode 191*a* and symmetrical with the branches 197 of the first subpixel electrode 191*a*. In an exemplary embodiment, the lengths of the multiple dummy pixel portions 198 may be approximately equal. In addition, the lengths of the multiple dummy pixel portions 198 may be variously designed.

The dummy pixel portion 198 may disperse the force applied to the liquid crystal and accordingly, an alignment direction of the liquid crystal around the corner of the surrounding portion 196 of the first subpixel electrode 191*a* may be similar to that of the branches 197 of the first subpixel electrode 191*a*. The dummy pixel portion 198 may reduce the disclination generated around the corner of the first subpixel electrode 191*a* and improve the transmittance.

Figure 9:
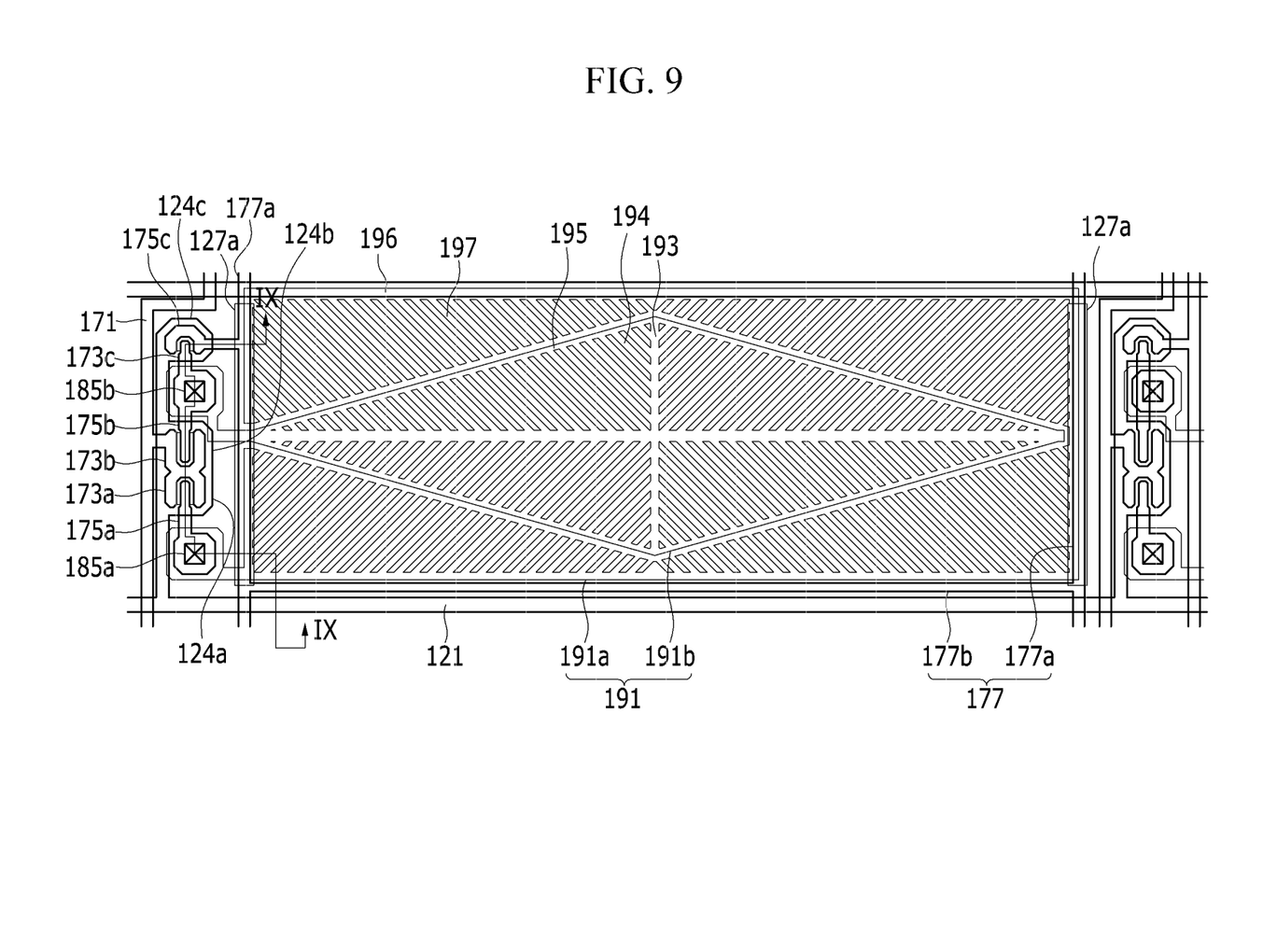
FIG. 9 is a layout view for one pixel of a liquid crystal display according to an exemplary embodiment.
Figure 10:
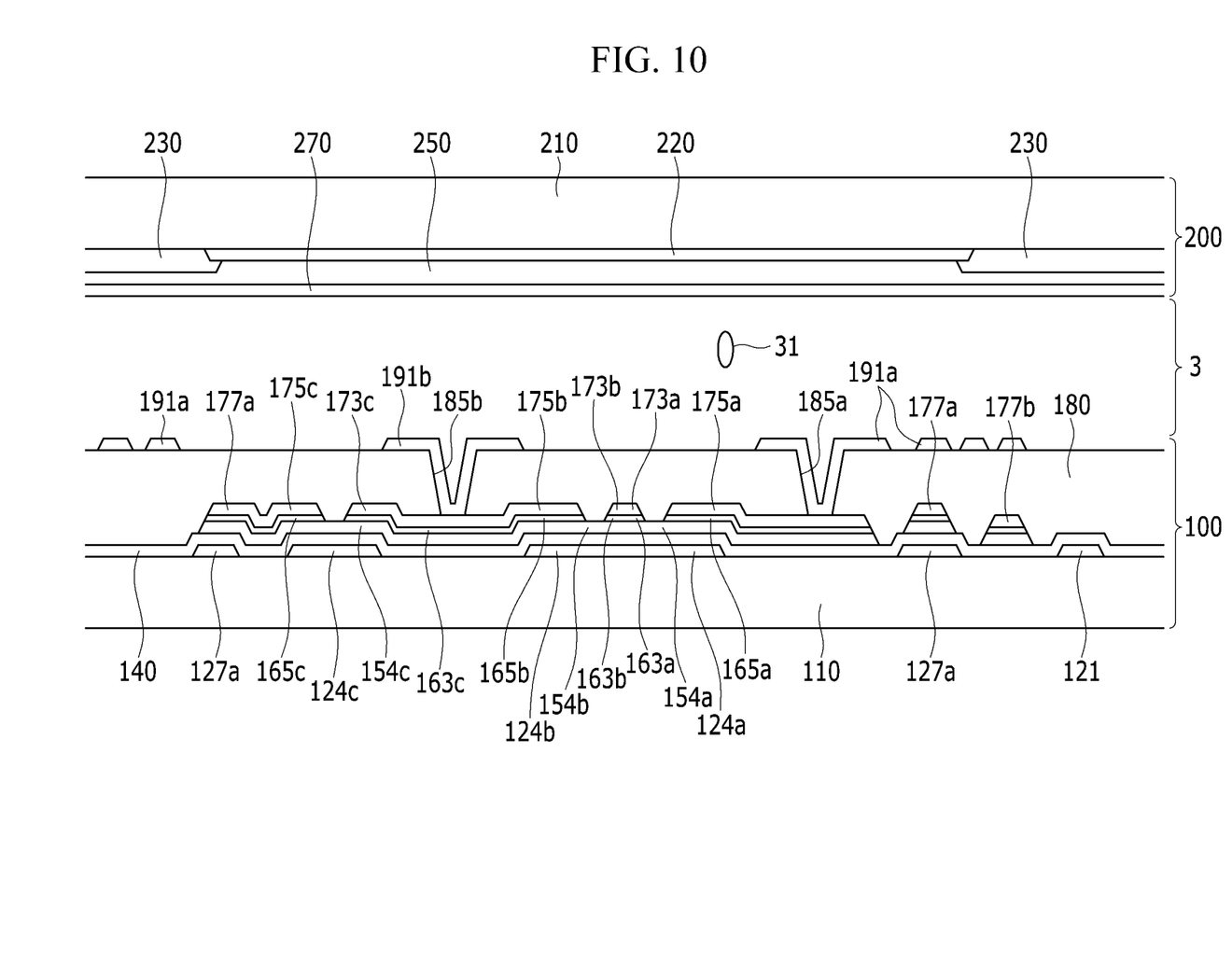
FIG. 10 is a cross sectional view taken along line IX-IX of FIG. 9.

Hereinafter, a liquid crystal display according to an exemplary embodiment of the present invention will be described with reference to FIG. 9 and FIG. 10. FIG. 9 is a layout view for one pixel of a liquid crystal display according to an exemplary embodiment. FIG. 10 is a cross sectional view taken along line IX-IX of FIG. 9. Where the description of FIG. 9 and FIG. 10 duplicates the descriptions of FIG. 1 to FIG. 4 it is omitted.

Referring to FIGS. 9 and 10, the liquid crystal display includes a blocking member 127*a*. The blocking member 127*a* is disposed below a vertical portion 177*a* of the reference voltage line 177 and positioned on the substrate 110, the same layer as the gate line 121.

The blocking member 127*a* may prevent a semiconductor 157 disposed below the vertical portion 177*a* of the reference voltage line 177 from being activated by the light and stably maintain the voltage value applied to the reference voltage line 177.

According to the exemplary embodiments, transmittance and response speed of the liquid crystal molecules may be improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
a first substrate;
a second substrate facing the first substrate;
a liquid crystal layer disposed between the first substrate and the second substrate, the liquid crystal layer including comprising liquid crystal molecules; and
a pixel electrode comprising a first subpixel electrode and a second subpixel electrode,
wherein a shape of the second subpixel electrode is a quadrilateral in which two angles facing each other are obtuse angles or acute angles, and the first subpixel electrode surrounds the second subpixel electrode.

2. The liquid crystal display of claim 1, wherein:
two sides facing each other in the quadrilateral are substantially parallel to each other.

3. The liquid crystal display of claim 2, wherein:
lengths of two sides facing each other in the quadrilateral are substantially equal.

4. The liquid crystal display of claim 3, wherein:
the quadrilateral is a rhombus.

5. The liquid crystal display of claim 1, wherein:
the second subpixel electrode comprises a cross stem and a first branch extending in one of an upper right, lower right, upper left, and lower left directions from the cross stem.

6. The liquid crystal display of claim 5, wherein:
the second subpixel electrode comprises a plurality of first branches and an oblique side portion connecting ends of the plurality of first branches to each other.

7. The liquid crystal display of claim 1, wherein:
the first subpixel electrode comprises a hole, a perimeter of the first subpixel electrode has a quadrilateral shape, and the hole and the second subpixel electrode have the same shape as each other.

8. The liquid crystal display of claim 1, wherein:
the first subpixel electrode comprises a surrounding portion comprising four corners and a second branch extending in one of an upper right, lower right, upper left, and lower left directions from the a corner.

9. The liquid crystal display of claim 1, wherein:
the first subpixel electrode comprises a first upper right region, a first lower right region, a first upper left region, and a first lower left region;

the second subpixel electrode comprises a second upper right region, a second lower right region, a second upper left region, and a second lower left region; and wherein the first upper right region faces the second upper right region, the first lower right region faces the second lower right region, the first upper left region faces the second upper left region, and the first lower left region faces the second lower left region.

10. The liquid crystal display of claim 9, wherein:
inclined angles of the liquid crystal molecules in the first upper right region and the second upper right region are substantially the same as each other, inclined angles of the liquid crystal molecules in the first lower right region and the second lower right region are substantially the same as each other, inclined angles of the liquid crystal molecules in the first upper left region and the second upper left region are substantially the same as each other, and inclined angles of the liquid crystal molecules in the first lower left region and the second lower left region are substantially the same as each other.

11. The liquid crystal display of claim 1, wherein:
the first subpixel electrode comprises a dummy pixel portion disposed around a corner of the first subpixel electrode.

12. The liquid crystal display of claim 11, further comprising:
a light blocking member overlapping the dummy pixel portion.

13. The liquid crystal display of claim 11, wherein:
a branch of the dummy pixel portion extends in a direction symmetric with a branch of the first subpixel electrode.

14. The liquid crystal display of claim 1, further comprising:
a gate line disposed on the first substrate;
a data line disposed on the first substrate;
a first switching element connected to the gate line and the data line; and
a second switching element connected to the gate line and the data line,
wherein the first subpixel electrode is connected to the first switching element and the second subpixel electrode is connected to the second switching element.

15. The liquid crystal display of claim 14, further comprising:
a third switching element connected to the gate line and the second switching element.

16. The liquid crystal display of claim 15, further comprising:
a reference voltage line connected to the third switching element.

17. The liquid crystal display of claim 16, wherein:
an input terminal of the third switching element is connected to an output terminal of the second switching element, an output terminal of the third switching element is connected to the reference voltage line, and a control terminal of the third switching element is connected to the gate line.

18. The liquid crystal display of claim 16, further comprising:
a common electrode disposed on the second substrate,
wherein a magnitude of the reference voltage applied to a reference voltage line is greater than a magnitude of the common voltage applied to a common electrode.

19. The liquid crystal display of claim 16, wherein:
the reference voltage applied to the reference voltage line comprises a swing signal.

20. The liquid crystal display of claim 14, wherein:
a magnitude of the voltage applied to the second subpixel electrode is smaller than a magnitude of the voltage applied to the first subpixel electrode.

21. The liquid crystal display of claim 14, wherein:
an area of the second subpixel electrode is equal to or greater than an area of the first subpixel electrode.

22. A liquid crystal display, comprising:
a first substrate;
a second substrate facing the first substrate;
a liquid crystal layer disposed between the first substrate and the second substrate, the liquid crystal layer comprising liquid crystal molecules; and
a pixel electrode comprising a first subpixel electrode and a second subpixel electrode,
wherein the second subpixel electrode comprises a polygonal shape in which two angles facing each other are obtuse angles or acute angles, and the first subpixel electrode surrounds the second subpixel electrode.

23. The liquid crystal display of claim 22, wherein:
two sides facing each other in the polygon are substantially parallel to each other.

24. The liquid crystal display of claim 23, wherein:
lengths of two sides facing each other in the polygon are substantially equal.

25. The liquid crystal display of claim 24, wherein the polygon is a rhombus.

* * * * *